United States Patent
Arai et al.

(10) Patent No.: US 7,666,530 B2
(45) Date of Patent: Feb. 23, 2010

(54) PERPENDICULAR MAGNETIC RECORDING MEDIUM, AND MAGNETIC RECORDING/REPRODUCING APPARATUS USING THE SAME

(75) Inventors: Reiko Arai, Kanagawa (JP); Yoshinori Honda, Kanagawa (JP); Hiroyuki Matsumoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 600 days.

(21) Appl. No.: 11/246,452

(22) Filed: Oct. 6, 2005

(65) Prior Publication Data

US 2006/0083951 A1  Apr. 20, 2006

(30) Foreign Application Priority Data

Oct. 15, 2004 (JP) .............................. 2004-302033

(51) Int. Cl.
*G11B 5/66* (2006.01)
(52) U.S. Cl. ..................................................... 428/831
(58) Field of Classification Search ........................ None
See application file for complete search history.

(56) References Cited

U.S. PATENT DOCUMENTS

| | | | |
|---|---|---|---|
| 5,838,517 A | | 11/1998 | Frater et al. |
| 6,462,911 B1 | | 10/2002 | Tokuyama et al. |
| 6,686,070 B1 | * | 2/2004 | Honda et al. ................. 428/827 |
| 6,709,768 B2 | * | 3/2004 | Takahashi et al. .......... 428/836.1 |
| 6,846,581 B2 | * | 1/2005 | Oikawa et al. ............... 428/828 |
| 6,858,330 B2 | * | 2/2005 | Tanahashi et al. ............ 428/827 |
| 7,038,881 B2 | * | 5/2006 | Ito et al. .................. 360/125.14 |
| 7,247,395 B2 | * | 7/2007 | Nakamura et al. ......... 428/831.2 |
| 7,323,259 B2 | * | 1/2008 | Chen et al. ................. 428/828.1 |
| 2007/0037016 A1 | * | 2/2007 | Do et al. ....................... 428/828 |

FOREIGN PATENT DOCUMENTS

| | | |
|---|---|---|
| JP | 06-103553 | 4/1994 |
| JP | 2001-155321 | 6/2001 |
| JP | 2003-162806 | 6/2003 |

* cited by examiner

*Primary Examiner*—Holly Rickman
(74) *Attorney, Agent, or Firm*—Townsend and Townsend and Crew LLP; Darren Gold

(57) ABSTRACT

Embodiments of the invention relate to easily achieving a perpendicular magnetic recording medium with high reliability and a magnetic recording apparatus with high recording density by improving the magnetic properties and surface smoothness of the soft magnetic underlayer and, moreover, enhancing adhesion with the substrate. In one embodiment, a perpendicular magnetic recording media composing a substrate, an adhesion layer formed on the substrate in which a second underlayer is laminated on a first underlayer, a soft magnetic underlayer formed on the second underlayer, an intermediate layer formed on the soft magnetic underlayer, a perpendicular recording layer formed on the intermediate layer, wherein the aforementioned first underlayer consists of an alloy composed of at least two elements selected from the group of Ni, Al, Ti, Ta, Cr, and Co, and the aforementioned second underlayer consists of Ta or a Ta-based amorphous structured alloy containing at least one element selected from the group of Ni, Al, Ti, Cr, and Zr.

21 Claims, 8 Drawing Sheets

Medium I
(This invention)

Medium J
(Reference)

(a)

(b)

PERPENDICULAR MAGNETIC RECORDING MEDIUM, AND MAGNETIC RECORDING/REPRODUCING APPARATUS USING THE SAME

CROSS-REFERENCES TO RELATED APPLICATIONS

This application claims priority from Japanese Patent Application No. JP2004-302033, filed Oct. 15, 2004, the entire disclosure of which is incorporated herein by reference.

BACKGROUND OF THE INVENTION

The present invention relates to a magnetic recording medium and a magnetic recording apparatus. In particular, the present invention relates to a perpendicular magnetic recording medium suitable for a high recording density and a magnetic recording apparatus having a perpendicular magnetic recording medium.

Attention has been paid to perpendicular recording as a technology for achieving a high recording density in a magnetic recording in lieu of a longitudinal magnetic recording of the prior art. In a perpendicular recording, a combination of a double layer perpendicular magnetic recording medium, which is composed of a soft magnetic underlayer and a perpendicular recording layer, and a single-pole type head is effective to realize a high recording density. In general, because a soft magnetic underlayer is composed of a soft magnetic material with high saturation flux density (Bs), it has been pointed out that problems arise such as leakage magnetic flux generated by domain walls of the soft magnetic underlayer being observed as spike noise and the recorded magnetization being erased by moving the domain walls. Moreover, the thickness of the soft magnetic underlayer is as thick as from several tens of nanometers to several hundreds of nanometers, so that there is a possibility that the surface smoothness is deteriorated, the formation of the perpendicular recording layer and the fly stability of the head influenced harmfully, and the adhesion to the substrate deteriorated because of a large film stress.

As a means to solve these problems, a method is proposed in which the wall motion of the soft magnetic underlayer is prevented by an exchange coupling with an antiferromagnetic layer where the magnetic spin is aligned in the same direction as that disclosed in Patent Document 1 (JP-A No. 103553/1994). Furthermore, in Patent Document 2 (JP-A No.155321/2001), a method is disclosed in which the soft magnetic underlayer is composed of two or more layers of soft magnetic layers being separated from each other by a nonmagnetic layer, and where the magnetization of the soft magnetic layer is fixed toward the opposite direction. However, these methods are effective to prevent the soft magnetic underlayer from wall motion, but the problems such as surface smoothness of the soft magnetic underlayer and the fly stability of the head cannot be solved.

Patent Document 3 (JP-A No. 162806/2003) discloses a method in which a pre-coat layer to increase adhesion with a substrate and an fcc-structured nonmagnetic layer to improve the orientation of the antiferromagnetic layer are formed between the substrate and the anti-ferromagnetic layer. However, the method described above is also effective to prevent the soft magnetic underlayer from wall motion, but it does not describe the effect of the adhesion, so that the problem of the fly stability of the head cannot be solved at the same time.

BRIEF SUMMARY OF THE INVENTION

A feature of the present invention is to provide a highly reliable perpendicular magnetic recording medium and a high recording density magnetic recording medium apparatus which solve these problems by improving the magnetic properties and the surface smoothness and increasing the adhesion with the substrate.

In accordance with an aspect of the present invention, a perpendicular magnetic recording medium for a magnetic recording apparatus comprises a substrate, an adhesion layer formed on a substrate in which a second layer is laminated on the top of a first underlayer, a soft magnetic under layer formed on the second underlayer, an intermediate layer formed on the soft magnetic underlayer, and a perpendicular recording layer formed on the intermediate layer, in which the first underlayer consists of an alloy composed of at least two elements selected from the group of Ni, Al, Ti, Ta, Cr, and Co; the second underlayer consists of Ta or an amorphous structured Ta-based alloy containing at least one element selected from the group of Ni, Al, Ti, Cr, and Zr; the soft magnetic underlayer consists of a first soft magnetic layer, a second soft magnetic layer, and a nonmagnetic layer formed between the first and second soft magnetic layers in which the first soft magnetic layer and the second soft magnetic layer are anti-ferromagnetically coupled to each other through the nonmagnetic layer.

According to the present invention, a perpendicular recording medium having excellent scratch resistance and fly stability of the head can be provided, and a magnetic recording apparatus having excellent reliability and stability can be achieved.

DETAILED DESCRIPTION OF THE INVENTION

Figure 1:
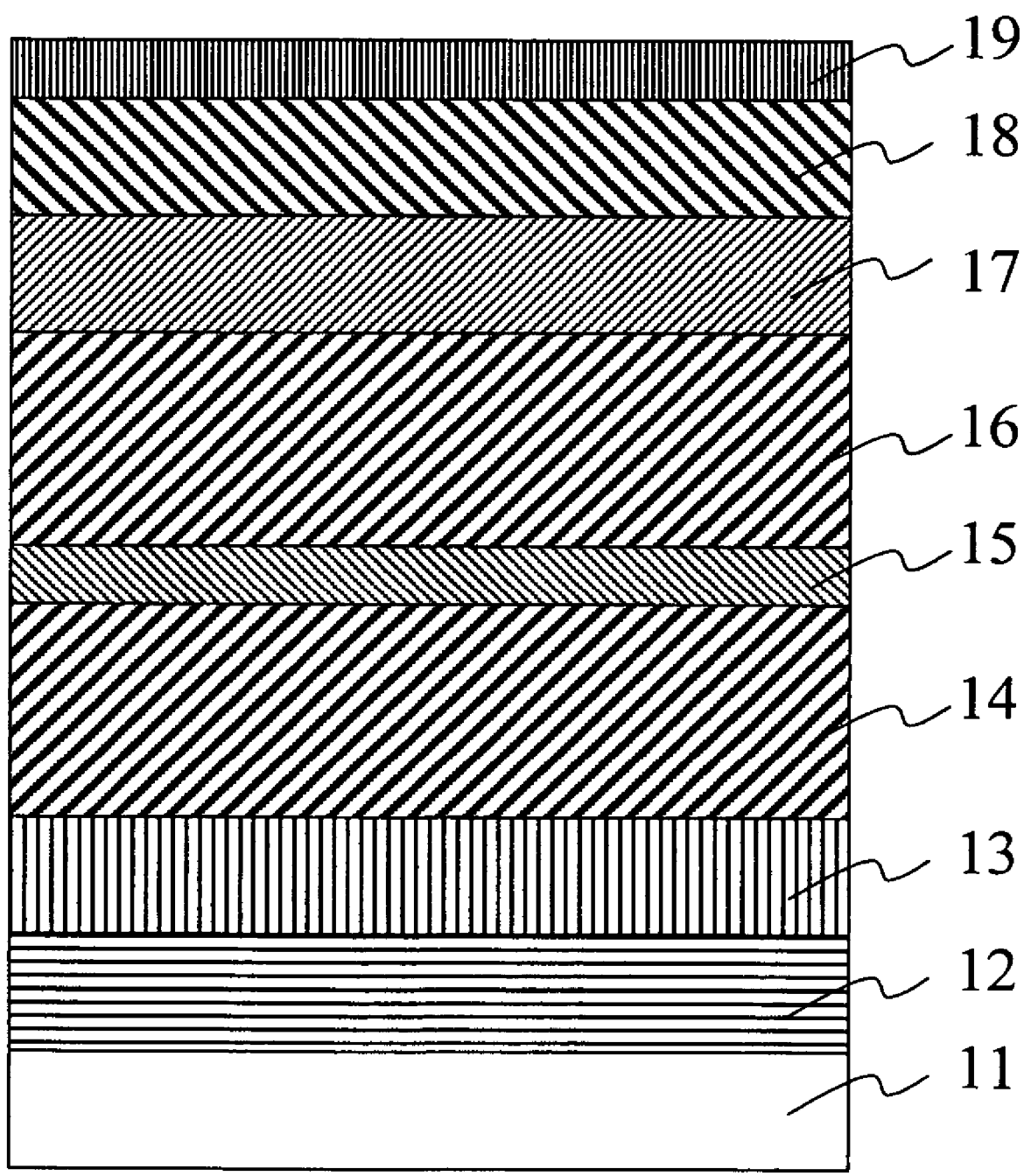
FIG. 1 is a layer configuration illustrating a perpendicular magnetic recording medium according to an embodiment of the present invention.

A magnetic recording medium using the present invention is described in detail by the following examples. In a perpendicular magnetic recording medium using the present invention, a first underlayer and a second underlayer are deposited on a substrate; a soft magnetic underlayer is formed on the second underlayer; an intermediate layer is formed on the soft magnetic underlayer; and a perpendicular recording layer is formed on the intermediate layer.

A preferable material for the first underlayer is selected from a group which has excellent adhesion. The material is preferably composed of an alloy containing at least two elements selected from the group of Ni, Al, Ti, Ta, Cr, and Zr. Concretely, for instance, CoTi, CoTa, CrTi, CrTa, AlTi, AlTa, AlNi, CoTiNi, CoTiAl, CrTiAl, and CrTiTa, etc. can be used for the alloy. Using these materials makes it possible to improve the scratch resistance and fly stability. Moreover, it is preferable for compatibility of excellent scratch resistance with magnetic properties that the thickness of the first underlayer be about 2 nm or more and about 20 nm or less.

A material having excellent surface smoothness is preferable to be used for the second underlayer. The material is preferably composed of Ta or an amorphous structured Ta-based alloy containing at lease one element selected from the group of Ni, Al, Ti, Cr, and Zr. Herein, amorphous means that no other obvious diffraction peaks can be observed in the x-ray diffraction spectrum except for a halo pattern, or that the average grain size observed in the lattice image taken by a high resolution transmission electron microscope is about 5 nm or less. Concretely, for instance, NiTa, AlTa, CrTa, NiTaZr, NiTaTi, NiTaCr, and NiTaAl, etc. can be used for the material. Using these materials makes it possible to improve the magnetic properties of the soft magnetic underlayer, the orientation of the recording layer, and the read/write characteristics. Furthermore, the preferable thickness of the second underlayer is about 2 nm or more and about 30 nm or less. In the case when the film thickness is greater than about 2 nm, it can completely cover the surface roughness of the first underlayer, resulting in the magnetic properties of the soft magnetic underlayer being improved. On the other hand, in the case when the thickness is less than about 30 nm, excellent adhesion with the substrate can be obtained. Moreover, the compositions of the first underlayer and the second underlayer are preferably different.

The first soft magnetic layer and the second soft magnetic layer should have a Bs at least 1 Tesla or more, in which a uniaxial magnetic anisotropy is added along the radial direction of the disk substrate, and the coercivity measured along the head traveling direction is 1.6 kA/m or less. Moreover, it is understood that the present invention is not intended to be limited to a particular material if there is one with superior surface smoothness.

Concretely, the above-mentioned properties can be easily obtained when an amorphous alloy mainly composed of Co or Fe to which Ta, Hf, Nb, Zr, Ni, Si, B, and C are added. Coercivity can be controlled to be smaller when the film thickness is about 20 nm or more; spike noise can be prevented and stray field robustness can be improved when it is about 150 nm or less.

The nonmagnetic layer formed between the first soft magnetic layer and the second magnetic layer works so as to antiferromagnetically couple the first soft magnetic layer with the second magnetic layer. The preferable materials used for the nonmagnetic layer are Ru and Cu when a Co-based alloy is used for both soft magnetic layers. On the other hand, Cr and Ru are preferable when an Fe-based alloy is used for both soft magnetic layers.

The thickness of the nonmagnetic layer can be controlled to obtain an antiferromagnetic coupling between both soft magnetic layers, but the appropriate thickness depends on the materials of both magnetic layers, the deposition conditions, and the substrate temperature during deposition. For instance, in the case when Co-based alloys are used for both soft magnetic layers and Ru is used for the nonmagnetic layer, the thickness of the Ru layer is preferably controlled to be about 0.5-1.5 nm.

Moreover, in the case where there is a requirement to strengthen the antiferromagnetic coupling working between the first soft magnetic layer and the second soft magnetic layer, it is effective to form the nonmagnetic layer part to be a sandwich structure which is sandwiched by thin ferromagnetic layers with the thickness of about 0.5 to 5 nm. Concretely, as an example, a triple-layered structure composed of Co/Ru/Co, CoFe/Ru/CoFe, and Fe/Cr/Fe, etc. can be used. Or, the same effect can be obtained when an alloy of a nonmagnetic material and a ferromagnetic material is used for the nonmagnetic layer. Concretely, as an example, RuCo and RuFe, etc. can be used.

Applying a cooling process in a magnetic field is preferable in order to impart uniaxial magnetic anisotropy to the first soft magnetic layer and to the second magnetic layer. The magnetic field is preferably applied along the radial direction of the substrate, and it is necessary to saturate the magnetization along the radial direction of the soft magnetic layer, in which the strength of the magnetic field on the disk substrate may be at least 4 kA/m or more. It is desirable to bring the cooling temperature ideally down to room temperature. However, taking into consideration the shortening of the media manufacturing process time, it is realistic that it is cooled down until 80° C. to 100° C. Additionally, depending on the process for manufacturing medium it is not necessary to introduce the cooling process after forming the soft magnetic layer, and it may occur after forming the intermediate layer or the recording layer.

Since the nonmagnetic layer formed between the first soft magnetic layer and the second soft magnetic layer is very thin, there is a possibility that the antiferromagnetic coupling cannot be obtained due to interfacial diffusion which occurred during formation of the nonmagnetic layer according to the combination of materials, film thickness, and manufacturing conditions. Particularly, in the case where an amorphous structured alloy is used for the soft magnetic underlayer, it readily happens that the disk substrate temperature is high before forming the first soft magnetic layer. Therefore, a formation process which does not raise the substrate temperature is preferable, and the possibility to obtain the desired properties becomes higher because the interfacial diffusion is prevented when the aforementioned triple-layered structure composed of Co/Ru/Co, etc. is used for the nonmagnetic layer or an alloy layer composed of RuCo and RuFe, etc. is used for the nonmagnetic layer.

Ru, a Ru-based alloy having a hexagonal close-packed structure and a face-center cubic structure, and an alloy having a granular structure can be used for an intermediate layer. Moreover, the intermediate layer may be a single-layer film and a laminated film composed of materials with different crystal structures.

A granular structured alloy mainly composed of CoCrPt to which an oxide is added is used for the perpendicular recording layer. $CoCrPt—SiO_2$, CoCrPt—MgO, and CoCrPt—TaO, etc. can concretely be used for it. Moreover, a superlattice film such as a (Co/Pd) multilayer film, a (CoB/Pd) multilayer film, a (Co/Pt) multilayer film, and a (CoB/Pt) multilayer film, etc. can be used for it. For the overcoat layer of the perpendicular recording layer it is preferable that a film mainly composed of carbon with a thickness of 2 nm or more and 8 nm or less and, moreover, a lubricant layer such as perfluoro alkyl polyether etc. be used, resulting in a perpendicular recording medium with excellent reliability being obtained.

A glass substrate, an Al-based alloy substrate on which a NiP plate film is coated, a ceramic substrate, and a substrate on which a concentric circle shaped valley is formed by texture processing are used for the substrate.

A magnetic recording apparatus according to an embodiment of the present invention comprises the aforementioned perpendicular magnetic recording medium, an actuator driving it along the recording direction, a magnetic head having a write element and a read element, a mechanism of letting the magnetic head move relatively to the aforementioned perpendicular magnetic recording medium, and a read/write channel inputting the signal of the magnetic head and reproducing a readback signal, and it includes a write element and a single-pole type head, wherein a read element of the magnetic head includes a sensing device using magnetoresistance or tunneling magnetoresistance. Therefore, a magnetic recording apparatus having an areal recording density greater than 10 gigabits per square centimeter and excellent reliability can be achieved.

In the following, concrete embodiments applying the present invention are described with reference to drawings.

First Embodiment

FIG. 1 is a layer structure illustrating a perpendicular magnetic recording medium of the present invention. A disk with diameter of 2.5 inches is used for the substrate 11, and using a sputtering method, the first underlayer 12, the second underlayer 13, the first soft magnetic layer 14, the nonmagnetic layer 15, the second soft magnetic layer 16, the intermediate layer 17, and the perpendicular recording layer 18, and the protective layer 19 are formed in order. Table 1 shows the target, the Ar gas pressure, and the film thickness used for the preparation of each layer.

First, 5 nm thick CoTi being the first underlayer 12, 10 nm thick NiTa being the second underlayer 13, 100 nm thick CoTaZr being the first soft magnetic layer 14, 0.9 nm thick Ru being the nonmagnetic layer 15, and 100 nm thick CoTaZr being the second soft magnetic layer 16 are deposited in order, on the substrate 11, and the substrate is cooled down to about 80° C. or less in a magnetic field. Subsequently, 20 nm thick Ru being the intermediate layer 17, 20 nm thick CoCrPt—$SiO_2$ being the recording layer 18, 5 nm thick Carbon being the protection layer 19 are deposited. Then, a lubricant in which a perfluoro alkyl polyether-based material is diluted by fluoro carbon is coated, and the surface is burnished, resulting in a perpendicular recording medium of the present embodiment being completed.

A medium in which only the first underlayer 12 is formed (Media type B), a medium in which only the second underlayer 13 is formed (Media type C), and a medium in which the first soft magnetic layer 14 is directly formed (Media type D) on the substrate without forming the first underlayer and the second underlayer are prepared as a comparative example shown in Table 2. The other layer structures of the media in the comparative examples are the same as those of the present embodiment.

Figure 2:
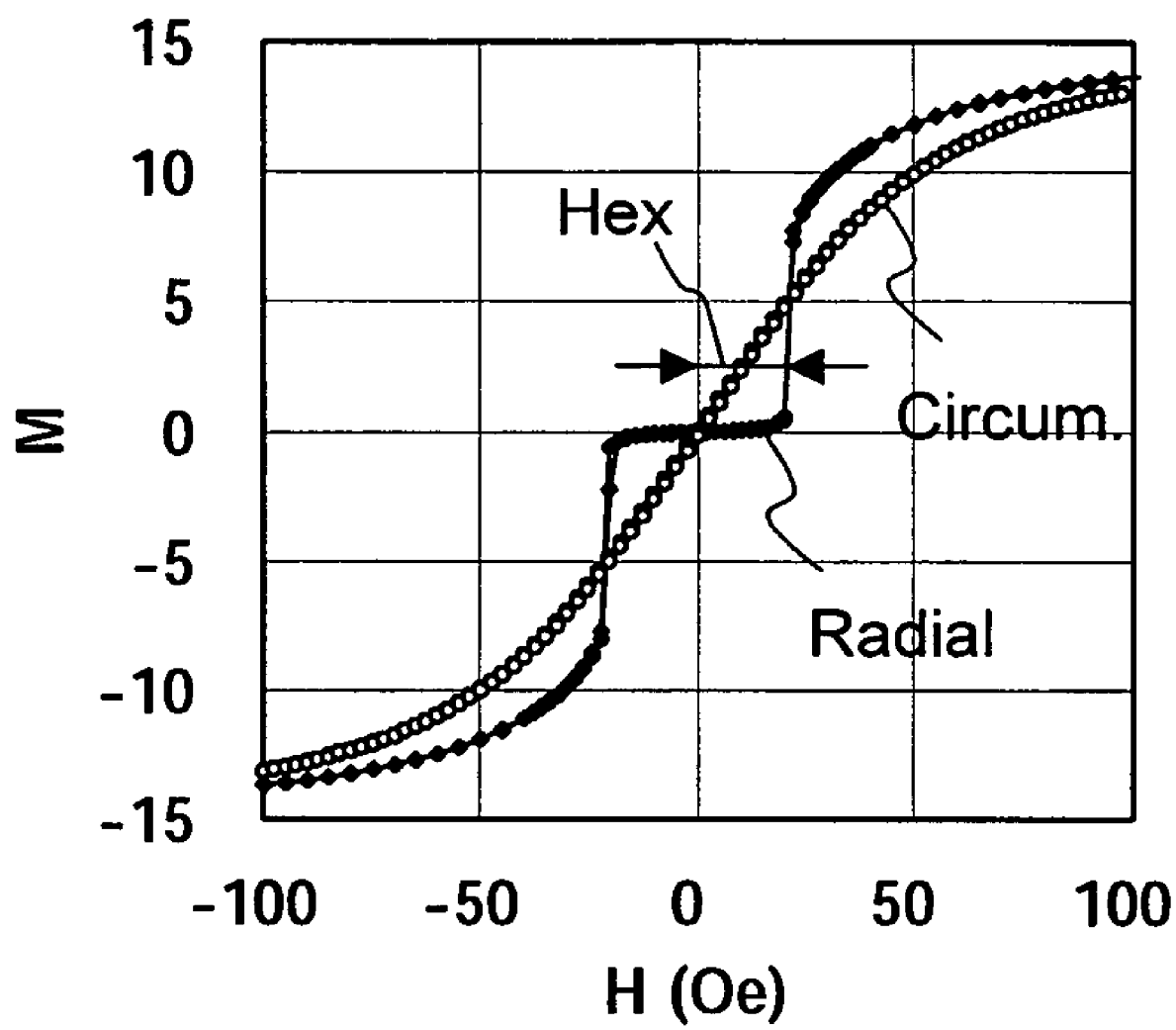
FIG. 2 shows a magnetization curve of the soft magnetic underlayer of one embodiment (Media type A).

FIG. 2 shows an example of a magnetization curve of the soft magnetic underlayer in Media type A of the embodiment measured by a vibrating sample magnetometer (VSM).

In the magnetization curve measured by applying a magnetic field along the radial direction of the disk substrate, the magnetization is almost zero in the magnetic field range of −20 to +200 Oe. This is because the magnetization of the CoTaZr, which are the first and the second soft magnetic layers, are antiferromagnetically coupled through the nonmagnetic layer, Ru, and oriented to the opposite direction with respect to each other. Under the condition when a strong positive magnetic field is applied, the magnetizations of the first and the second soft magnetic layers, CoTaZr, are oriented in the direction in which the magnetic field is applied. However, when the magnetic field becomes smaller than a certain value of magnetic field, Hex, the upper and lower side magnetizations become antiparallel as a result of the antiferromagnetic coupling through the Ru. It is understood that this Hex is a magnetic field effectively applied to the first and the second soft magnetic layers, CoTaZr, because of the antiferromagnetic coupling (hereinafter, this magnetic field is called Hex). When increasing the magnetic field in the negative direction, a magnetization process takes place in an opposite manner from the description mentioned above. Moreover, no shift or step can be observed in the magnetization curve measured by applying a magnetic field along the circumferential direction of the disk substrate, thereby it is understood that a flux reversal is progressing according to the flux rotation.

Figure 3:
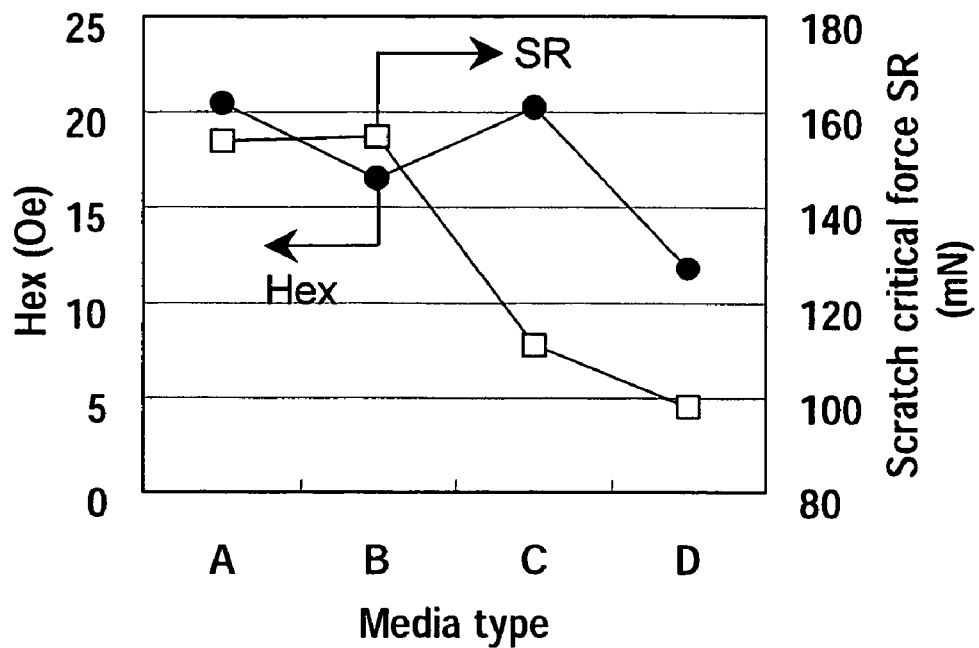
FIG. 3 shows a relationship between the scratch critical force SR and the Hex obtained from the magnetization curves which were measured by applying a magnetic field along the radial direction of the soft magnetic underlayer of an embodiment (Media type A) and the comparative examples (Media types B-D).

In FIG. 3 is shown the Hex of Media type A of the present invention, the Hex of Media types B-D of the comparative examples, and the scratch critical forces obtained from the scratch tests. The scratch test was carried out by a 5 μm R diamond needle being compulsorily vibrated by the ceramic actuator and being moved at a speed of 30 μm/sec with the stage being tilted 5 degrees. The load is gradually increased as the stage is moved laterally, and the sample is destroyed. It is understood that the scratch resistance is greater the stronger the mechanical failing load is, and that it has excellent adhesion. Herein, the thickness of the CoTi which is the underlayer of Media type B and the thickness of the NiTa which is the underlayer of Media type C are 15 nm, which is the same as the total thickness of the first and the second underlayers of Media type A.

It is understood that the Hex values of Media type A of the present invention and of Media type C of the comparative example are about 20 Oe, the value of Media type B is about 17 Oe which is slightly smaller than that of Media type A. The Hex of Media type D is still smaller than all of them. On the other hand, it is understood that Media types A and B had comparatively greater values of the scratch critical force, about 155 mN, and that Media type C and Media type D had smaller scratch critical forces of about 110 mN and 100 mN or less, respectively. Thus, in the case when a soft magnetic underlayer is directly formed on CoTi which is the first underlayer 12, the adhesion is excellent but the soft magnetic properties are not good. On the other hand, in the case when NiTa which is the second underlayer 13 is directly formed on the substrate 11 and the soft magnetic underlayer is formed on the top of it, excellent soft magnetic properties can be obtained, but the adhesion becomes worse. It becomes clear that both excellent adhesion and magnetic properties can be obtained by forming CoTi being the first underlayer 12 and NiTa being the second underlayer 13, in order, on the substrate 11 and forming the soft magnetic underlayer on the top of them, as shown in this embodiment.

Figure 4:
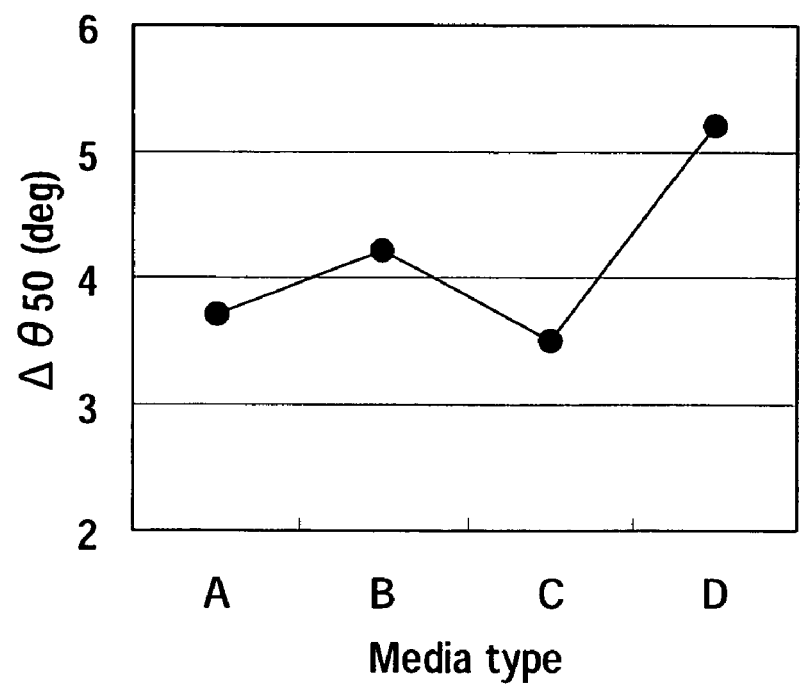
FIG. 4 shows the orientation of the intermediate layers, Ru, of an embodiment (Media type A) and the comparative examples (Media types B-D).

The orientation of Ru which is the intermediate layer 15 formed on the soft magnetic underlayer was evaluated by using X-ray diffraction measurements. FIG. 4 shows the $\Delta\theta_{50}$ values obtained from the rocking curves of the diffraction peak of Ru (001) (2θ=42.3–42.5°). Herein, it is understood that the smaller the $\Delta\theta_{50}$ values, the better is the orientation of Ru. It is shown that the $\Delta\theta_{50}$ values of Media A and C are about 3.5-3.7 degrees, the value of Media B is about 4.2 degrees, which means the orientation of Ru is slightly worse than Media A, and the value becomes extremely poor in Media D, which is 5.2 degrees. Moreover, it is understood that the $\Delta\theta_{50}$ values correspond well with Hex values shown in FIG. 4. When the Hex is small, $\Delta\theta_{50}$ becomes greater, and when the Hex becomes greater, $\Delta\theta_{50}$ becomes smaller, resulting in the orientation of Ru being improved.

Figure 5:
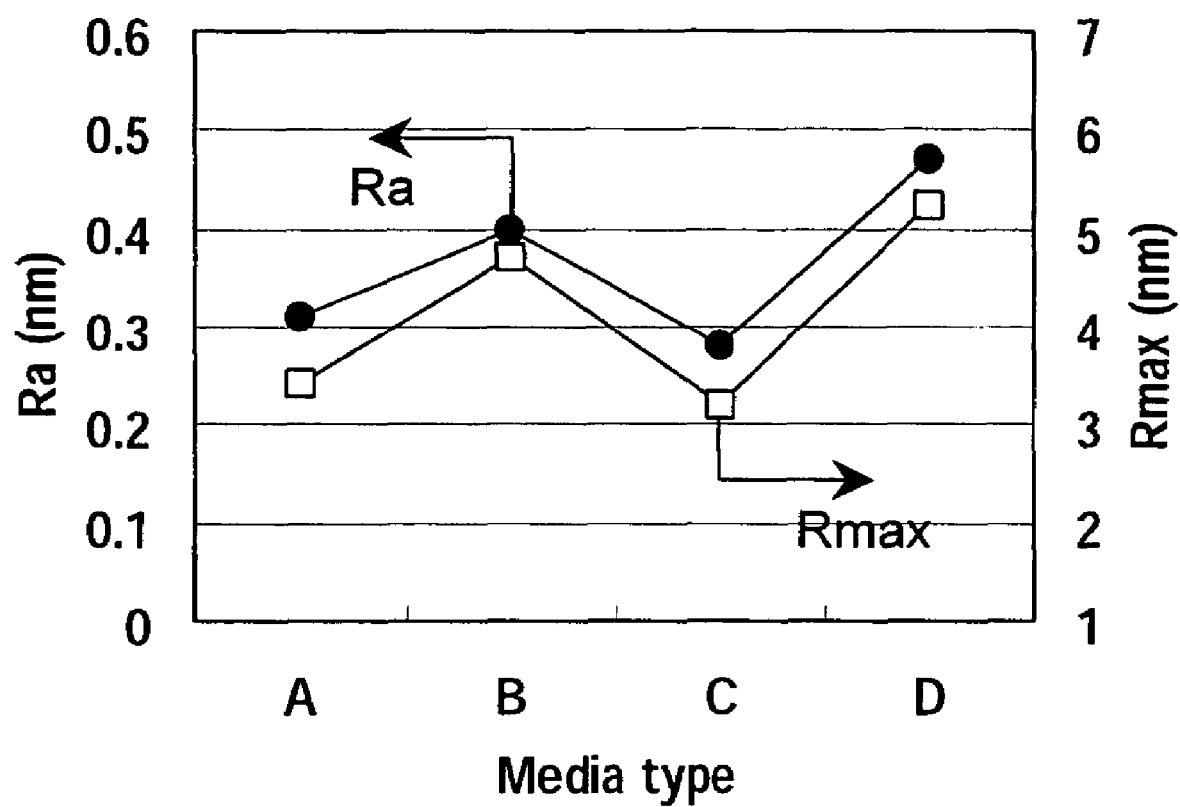
FIG. 5 shows the surface roughness (Ra and Rmax) of the soft magnetic underlayer of an embodiment (Media type A) and the comparative examples (Media types B-D).

Then, in order to investigate the reason for high Hex and high orientation, the surface roughness of the soft magnetic underlayer of the abovementioned Media types A-D was evaluated by using AFM. Here, Ra means the arithmetical mean deviation of profile and Rmax means the maximum roughness. As a result, as shown in FIG. 5, it is clearly understood that Media type A of the present invention and Media type C of the comparative example have smaller Ra and Rmax compared with Media types B and C of the comparative examples. It becomes clear that a higher Hex can be obtained by decreasing the surface roughness of the soft magnetic underlayer, and the orientation of the intermediate layer, Ru, formed on top of it is improved.

The magnetic properties, spike noise, and read/write characteristics of the recording layer of the aforementioned Media types A-D were evaluated. The results are shown in Table 3. The magnetic properties of the recording layer were measured in the range of applied magnetic field from +15 kOe to −15 kOe by using a vibrating sample magnetometer (VSM). The spike noise was measured in the range of disk radius, 16-30 mm, at a pitch of 100 µm using a spin stand and a digital oscilloscope. Moreover, the read/write characteristics were evaluated under the condition of a flying height of 10 nm by using a single-pole head with a track width of 0.25 µm for writing and a GMR head with a shield distance of 0.08 µm and a track width of 0.22 µm for reading. The S/N was defined here as S/N=20 log (So/NdHF) by using the medium noise (NdHF) and the isolated waveform output (So) while writing at 800 kFCI, and the resolution was defined as SMF/So. Moreover, the error rate was evaluated by the readback waveform of the signal through an EEPR4 system signal processing circuit.

Media type A and Media type C of this embodiment which had Ru intermediate layers with high orientation had relatively high coercivity, Hc, and excellent squareness ratio (SQ). Moreover, spike noise is prevented and excellent read/write characteristics could be obtained such as an S/N of 23 dB or more, a resolution of 23%, and a byte error rate of $10^{-6}$ or less. On the other hand, in the Media type B in which a soft magnetic underlayer was formed directly on the first underlayer 12 and Media type D in which a soft magnetic underlayer was formed directly on the substrate 11, spike noise was observed and the byte error rate became one order higher than that of Media A of this embodiment.

Four pieces of media having the same configuration as each of Media type A and Media type C which had low byte error rates were prepared and their fly stabilities were evaluated. As a result, it is understood that Media A of this embodiment had better fly stability than Media type C, and the fly stability can be improved by increasing adhesion with the substrate.

It became clear from the above-mentioned results that the underlayer of the present invention improves the adhesion with the substrate without losing the magnetic properties of the soft magnetic underlayer, and it is evident that there is remarkable effect on the read/write characteristics and the fly stability.

Next, the effect of the thickness of the underlayer on the magnetic properties of the soft magnetic underlayer and on the adhesion with the substrate was investigated. Herein, as shown in Table 4, CoTi which is the first underlayer is formed to be 5 nm in Media type A1, and the thickness of NiTa which is the second underlayer is changed from 1 nm to 35 nm. Moreover, in Media type A2, the thickness of NiTa, being the second underlayer, is fixed to be 5 nm and the thickness of CoTi being the first underlayer is changed from 1 nm to 35 nm. In Media type B and C of the comparative examples, the thickness of the underlayer is changed from 5 nm to 40 nm.

Figure 6:
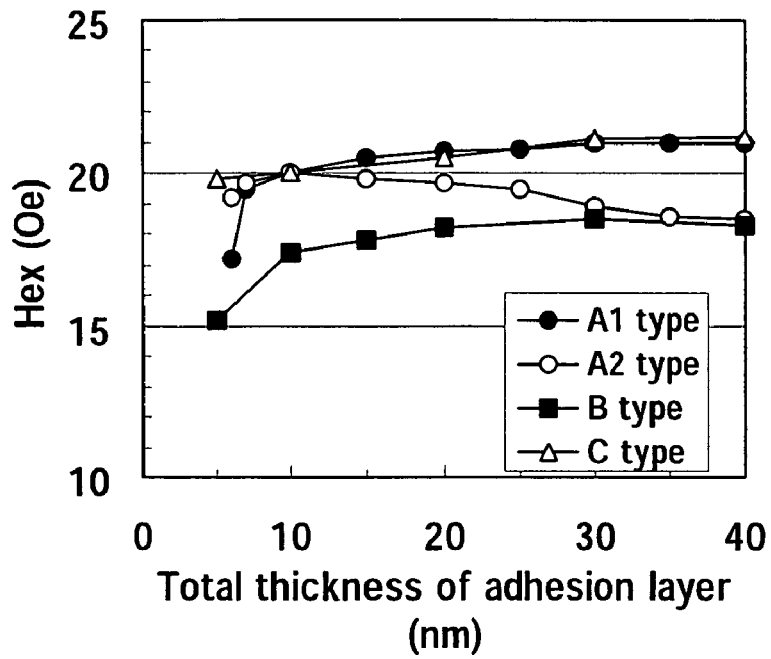
FIG. 6 shows a relationship between the thickness of the underlayer and the Hex obtained from the magnetization curves which were measured by applying a magnetic field along the radial direction of the soft magnetic underlayer of an embodiment (Media type A) and the comparative examples (Media types B-D).
Figure 7:
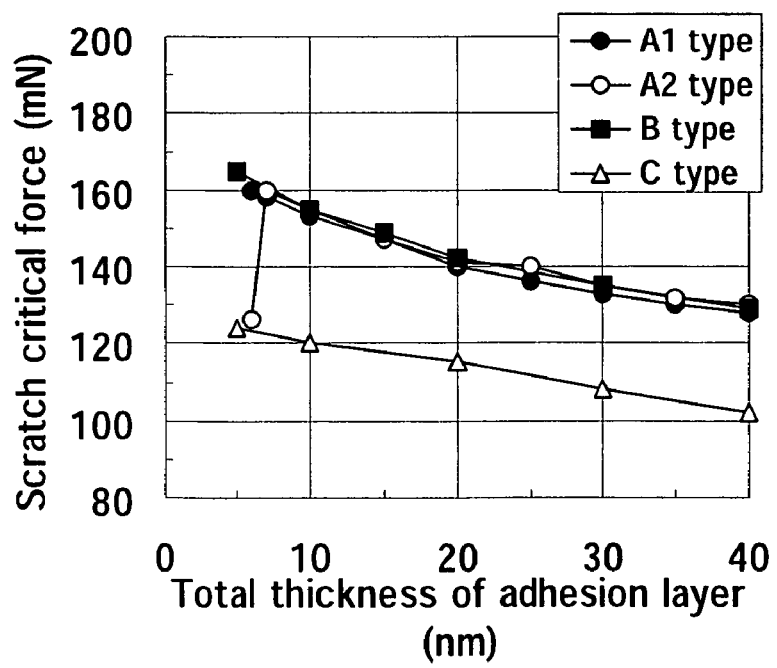
FIG. 7 shows a relationship between the thickness of the underlayer and the scratch critical force of an embodiment (Media type A) and the comparative examples (Media types B-C).

FIG. 6 shows the relationship between the underlayer thickness and Hex, and FIG. 7 shows the relationship between the underlayer thickness and the scratch critical force. In the Media type A1 of the present embodiment, Hex becomes low when the thickness of the second underlayer is as thin as 1 nm (total thickness of 6 nm), and a higher Hex can be obtained when the thickness is made thicker than 2 nm (total thickness of 7 nm), resulting in Hex being improved with increasing thickness. In Media type A2 of the present embodiment, Hex does not change and keeps a high value with the thickness of the first underlayer ranging from 1 to as much as 1-20 nm (total thickness of 6-25 nm), and Hex has a tendency to decrease when it becomes thicker than 20 nm (thickness of 25 nm). Moreover, in Media type B of the comparative example, it is understood that Hex has a tendency to increase with increasing thickness of the first underlayer, and Hex is still smaller than a medium of the present embodiment even if it is formed to be 30 nm which is comparatively thicker.

On the other hand, it is understood that the scratch critical force becomes lower with increasing thickness of the underlayer in all layer configurations. In Media type A1 of the present embodiment, the scratch critical force is kept high even if the thickness of the second underlayer is decreased to 1 nm (total thickness of 6 nm), but, in Media type A2, the scratch resistance drastically decreases when the thickness of the first underlayer is decreased to 1 nm (total thickness of 6 nm). It is understood in Media type C of the comparative example that the scratch critical force is lower than that of the other configurations, and no effect could be obtained even if the thickness of the second underlayer is made to be about 5 nm.

Spike noise and fly stability of the abovementioned media were evaluated. As a result, it was confirmed that spike noise was prevented in a medium having a Hex greater than 19 Oe, and excellent fly stability was obtained in a medium having a scratch critical force greater than 130 mN.

Thus, it became clear that the first underlayer of the present invention makes the adhesion worse when the thickness is smaller than 2 nm, and makes Hex less when the thickness is greater than 20 nm, and that the second underlayer makes Hex less when the thickness is smaller than 2 nm, and makes the adhesion worse when the thickness is greater than 30 nm, resulting in the adhesion being worse and the fly stability of the head being worse. Moreover, it also became clear that better magnetic properties and excellent adhesion can be obtained even if the thickness is smaller than the prior art because of the formation of the second underlayer on top of the first underlayer. Furthermore, in order to fabricate a medium having excellent fly stability in which the spike noise is prevented, it is desirable that the thicknesses of the first layer and the second underlayer are limited to about 2-20 nm and about 2-30 nm, respectively.

Although a glass substrate was used for the substrate 11 in the present embodiment, the same results can be obtained in the case when an Al-based alloy substrate on which a NiP plate film is coated, a ceramic substrate, and a substrate on which a concentric circle shaped valley is formed by texture processing are used for the substrate. Particularly, the effect of the present embodiment was obtained more remarkably in a substrate formed by texture processing.

Second Embodiment

Media were prepared in which CoTi, CoTa, CrTi, CrTa, AlTa, AlTi, AlNi, CoTiNi, CoTiAl, CrTiAl, and CrTiTa were used for the first underlayer 12, and Ta, NiTa, AlTa, CrTa, NiTaZr, NiTaTi, NiTaCr, and NiTaAl were used for the second underlayer 13 of the first embodiment. The composition of each layer on and after the underlayer, the thickness, and the manufacturing process are the same as those of the first embodiment.

Table 5 shows the Hex, the scratch critical force, the spike noise, and the read/write characteristics of the media described in the present invention which are evaluated by the same means as the first embodiment.

The coercivities of the recording layer in the above mentioned media are 5.9-6.2 kOe and the squareness ratios are 0.95-1.0. All of the media of the present embodiment have a soft magnetic underlayer with excellent magnetic properties, and the spike noise was prevented. Moreover, they had excellent adhesion and excellent read/write properties such as an S/N greater than 22 dB and a byte error rate of about $10^{-6}$. Particularly, the media in which NiTa, NiTaZr, and Ta were used for the second underlayer had high S/N, high adhesion, and a low byte error rate.

Third Embodiment

Media type A of first embodiment, Media type E in which CoTi being the first underlayer 12 are exchanged with NiTa being the second underlayer 13, Media type F in which another layer is formed between the substrate and the first underlayer 12, Media type G in which another layer is formed between the first underlayer 12 and the second underlayer 13, and Media type H in which another layer is formed between the second underlayer 13 and the first soft magnetic layer 14 were fabricated, and the scratch critical force, the spike noise, and the read/write characteristics were evaluated by the same means as the first embodiment. The results are shown in Table 6. The composition of each layer on and after the underlayer, the thickness, and the manufacturing process are the same as those of Media type A of the first embodiment. Additionally, the total thickness of the underlayer was controlled to be 20 nm in all the media.

A low scratch critical force and spike noise were observed in Media type E, in which the first underlayer 12 was exchanged with the second underlayer 13, and the byte error rate was also one order higher compared with Media type A of the present embodiment. Although the spike noise was prevented in Media type F in which 5 nm thick NiCrZr was formed between the substrate 11 and the first underlayer 13, excellent read/write characteristics were obtained, and the scratch critical force was low. On the other hand, in Media type G in which 5 nm thick NiCrZr was formed between the first underlayer 12 and the second underlayer 13, the read/write characteristics were worse than Media type A of the present embodiment, but the spike noise was prevented and an excellent scratch resistance, the same as Media type A, was obtained. Moreover, in Media type H in which 5 nm thick NiCrZr was formed between the second underlayer 13 and the first soft magnetic layer 14, spike noise was observed and the byte error rate was high.

Thus, for the underlayer of the present invention it is necessary that a first underlayer is formed directly on the substrate and a soft magnetic underlayer is formed directly on the second underlayer. According to this configuration, a high S/N, high adhesion, and a low byte error rate can be obtained.

Fourth Embodiment

Figure 8:
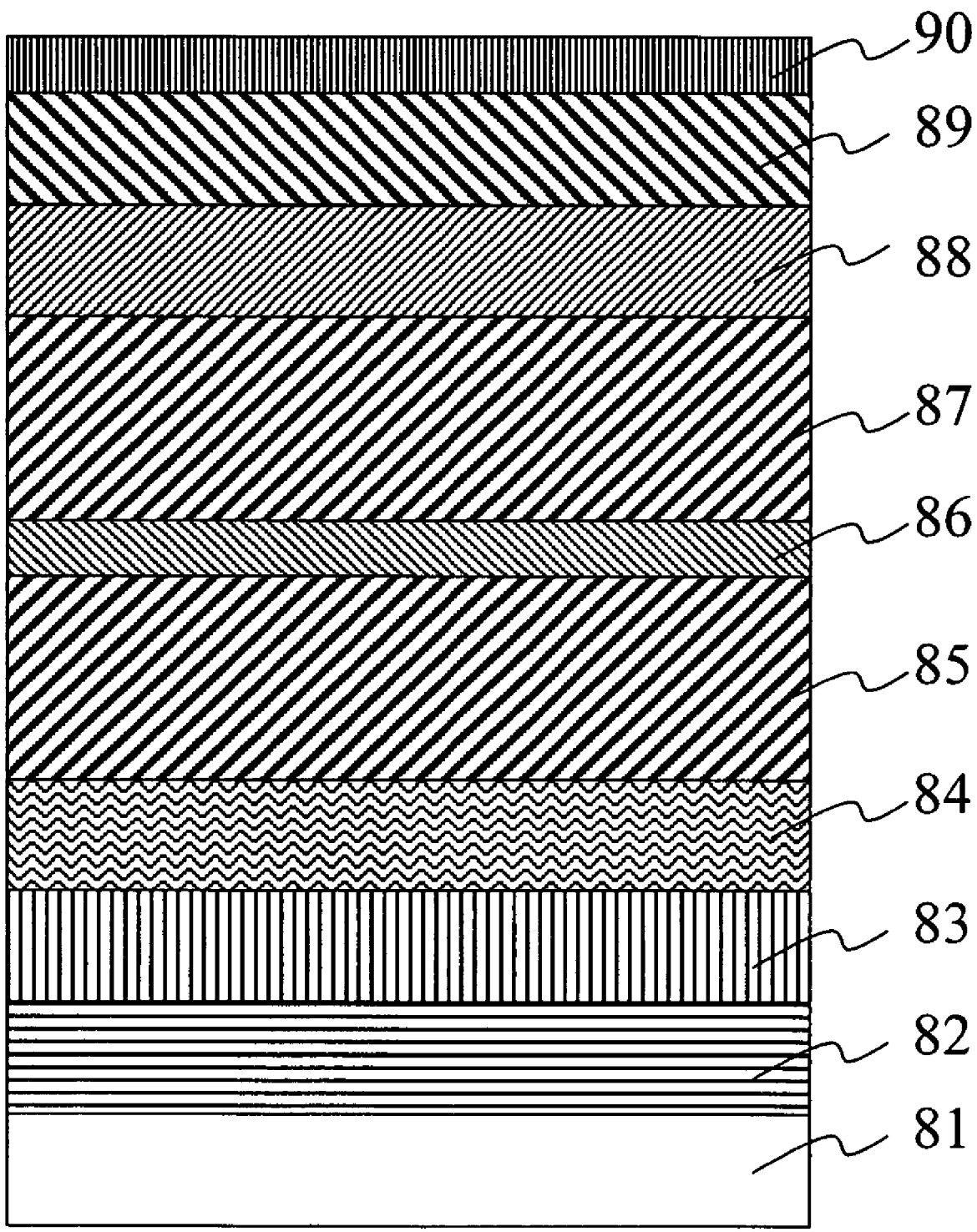
FIG. 8 shows a configuration of a perpendicular magnetic recording medium of another embodiment of the present invention.

FIG. 8 shows a configuration of a perpendicular magnetic recording medium of the present invention. A 2.5 inch glass disk is used for the substrate 81, and using a sputtering method, the first underlayer 82, the second underlayer 83, the domain control layer 84, the first soft magnetic layer 85, the nonmagnetic layer 86, the second soft magnetic layer 87, the intermediate layer 88, the perpendicular recording layer 89, and the overcoat layer 90 are formed in order. Table 7 shows the target, the Ar gas pressure, and the film thickness used for the preparation of each layer.

5 nm thick CoTiNi being the first underlayer 82, 15 nm thick NiTaZr being the second underlayer, and NiFe/FeMn/CoFe with each layer thickness being 5 nm/15 nm/2.5 nm which will be the domain control layer 84 were formed on the glass substrate 81 on which a concentric circle shaped valley was formed by textures processing. On the top of these, 50 nm thick CoTaZr being the first soft magnetic layer 85, 0.7 nm thick Ru being the nonmagnetic layer 86, 50 nm thick CoTaZr being the second soft magnetic layer 87 were formed in order, and the substrate was cooled down to below about 80° C. in a magnetic field. Moreover, 1 nm/19 nm thick Ta/Ru being the intermediate layer 88 and 20 nm thick CoCrPt—$SiO_2$ being the recording layer 89 were formed in order. Then, 5 nm thick Carbon being the overcoat layer 90 was formed. The magnetic field during the cooling process was 4 kA/m at the center of the substrate. Then, a lubricant in which a perfluoro alkyl polyether-based material is diluted by fluoro carbon was coated, and the surface burnished, resulting in a perpendicular recording medium I of the present invention being completed.

Media type J, in which 15 nm thick crystalline NiAl is formed to be the second underlayer in lieu of the amorphous structured NiTaZr, was formed as a comparative example. The other layer structures of the media in the comparative examples are the same as those of the present embodiment.

In order to investigate the magnetic property distribution of the soft magnetic layer as a function of the position of the substrate, the magnetization curves were measured in a total of 12 places, four places along the circumferential direction and three placed along the radial direction. Herein, the applied magnetic field direction was the radial direction of the substrate. Table 7 shows the Hex obtained in each position of Media type I of the present invention and Media type J of the comparative example. In both media, Hex becomes smaller the more one comes to the inner side. In Media type I of the present embodiment, the variation of Hex is smaller along the radial direction and the distribution along the circumferential direction is also small. On the other hand, in Media type J of the comparative example, it is understood that the decrease of Hex at the inner side is larger and the distribution along the circumferential direction (angle) is also larger. Because a concentric circle shaped valley is formed by texture processing on the substrate of the present embodiment, anisotropy is easily observed along the circumferential direction because of the influence of the shape anisotropy. Because an amorphous alloy is used for the second underlayer in Media type I of the present embodiment, a concentric circle shaped valley formed by texture processing becomes smaller. On the other hand, in Media type J of the comparative example, the roughness of the substrate is enhanced because a crystalline alloy is used for the second underlayer. Therefore, there is a gradient in the anisotropy in the circumferential direction the closer the inner side is approached, resulting in the Hex becoming smaller. According to a comparison of the surface smoothness of both samples using an AFM, Ra and Rmax of Media type I of the present invention were 0.35 nm and 3.8 nm, respectively, and Ra and Rmax of Media type J of the comparative example were 0.46 nm and 5.1 nm, respectively. This means that Media type I of the present embodiment has better surface smoothness. By the way, the surface roughness of the substrate at this time had an Ra and an Rmax of 0.44 nm and 4.5 nm, respectively.

Figure 9:
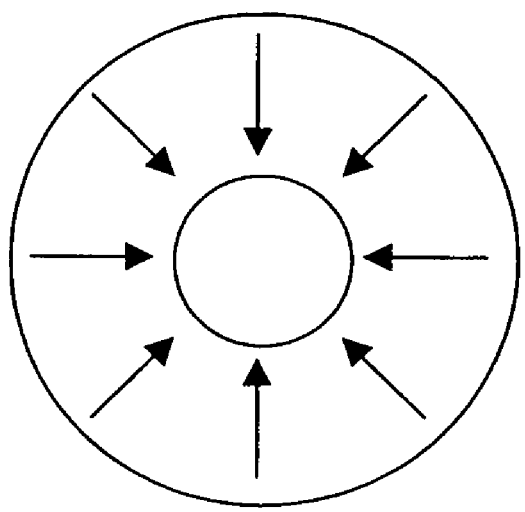
FIG. 9 is a schematic drawing illustrating the magnetization states of the soft magnetic underlayers of one embodiment, Media type I, and a comparative example, Media type J.
Figure 9:
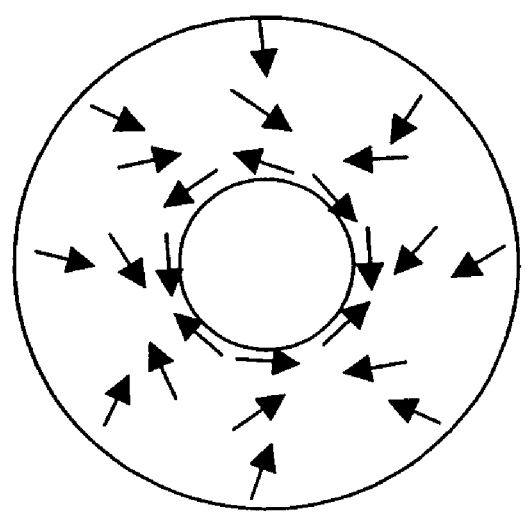

FIG. 9 shows schematic drawings illustrating the residual magnetization state of the second soft magnetic layer expected from the distribution of Hex shown in Table 8. The magnetization of CoTaZr in Media type I of the present embodiment is almost pointing in the radial direction and it is in the state of a quasi-single domain. On the other hand, the magnetization of Media type J of the comparative example is comparatively pointing in the radial direction but the magnetization begins to point in the circumferential direction as the inner radius is approached. It is thought that CoTaZr becomes a multi-domain state. Actually, when the domain image of CoTaZr of the second soft magnetic layer 87 was observed by using an optical surface analyzer, a uniform contrast was observed at all the surfaces of the substrate in Media type I, which means a quasi-single domain state, and magnetic domains were observed in Media type J.

Spike noise and read/write characteristics of these media were evaluated using the same means as the first embodiment. The results are summarized in Table 9. In Media type I of the present embodiment, spike noise was prevented, and excellent read/write properties were obtained, such as an S/N greater than 23 dB and a byte error rate of about $10^{-6}$ or less. However, in Media type J, spike noise was observed, and a one order higher byte error rate was obtained compared with Media type I.

Fifth Embodiment

A medium, which has the same layer configuration as Media type I of the second embodiment and has a different recording layer, was prepared and the read/write characteristics were evaluated by the same means as described in the first embodiment. The composition of each layer except for the recording layer, the thickness, and the manufacturing process are the same as those of Media type I of the second embodiment. Media type K has a granular structured recording layer composed of CoCrPt in which Ta oxide is added, and the recording layers of Media type L and Media type M are composed of multilayer films of Co/Pd and Co/Pt, respectively. As shown in Table 10, the read/write characteristics of Media type K were the most excellent compared with Media type L and Media type M. Thus, although the underlayer of the present invention gives excellent read/write characteristics even when Co/Pd and Co/Pt are used for the recording layer, it is understood that the greatest effect was obtained in the recording layer composed of a granular structured CoCrPt system in which an oxide is added.

Sixth Embodiment

Figure 10:
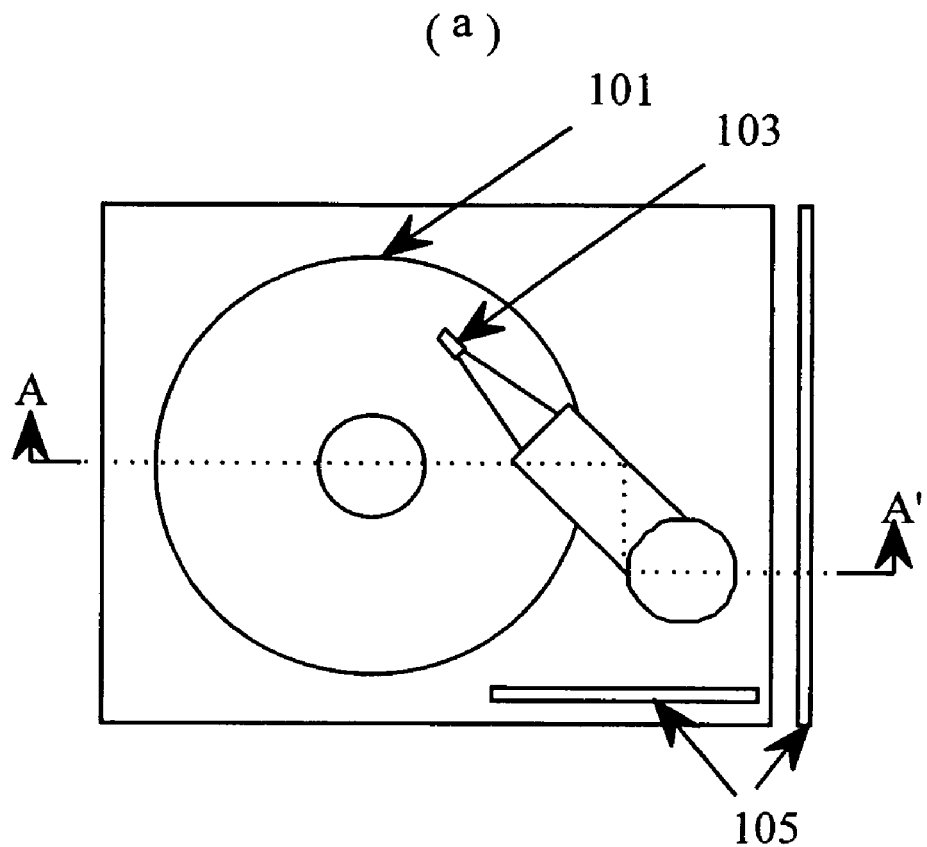
FIG. 10 (a) is a plane schematic drawing illustrating a magnetic recording apparatus of one embodiment of the present invention, and (b) is a longitudinal cross-section at the line A-A'.
Figure 10:
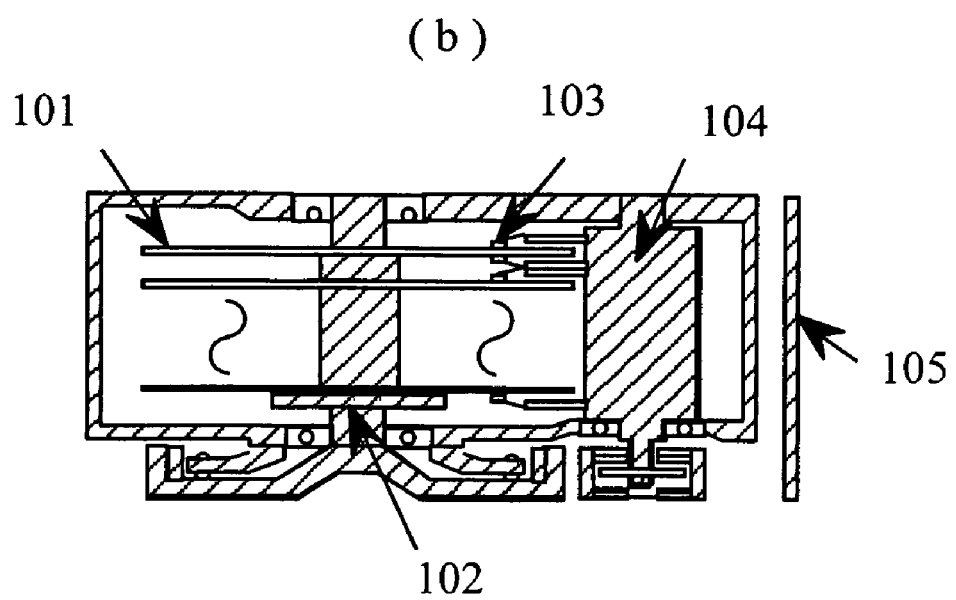

FIG. 10 is a schematic drawing illustrating an embodiment of a magnetic recording apparatus of the present invention. This apparatus is a magnetic recording apparatus which has a typical structure comprising the perpendicular magnetic recording medium 101, the actuator 102 driving it, the magnetic head 103, the driving means 104, and the read/write channel 105 of the magnetic head. The magnetic head used herein is a read/write separation type magnetic head formed on a magnetic head slider. The track width of the single-pole type magnetic head is 0.22 μm; the shield distance of the GMR head for reading is 0.08 μm; and the track width is 0.2 μm. Read/write characteristics were evaluated under the condition of a head fly height of 10 nm after composing the aforementioned Media type A101 of the first embodiment. As a result, it sufficiently met the specification of read/write characteristics which was an areal recording density of 10 gigabits per square centimeter in the temperature range from 10° C. to 50° C.

Moreover, when Media type A of the first embodiment is composed in a magnetic recording apparatus in which a sensing device using tunneling magnetoresistance is used for the reading head with the same structure as the aforementioned magnetic recording apparatus, and the read/write characteristics were evaluated under the condition of a head fly height of 8 nm, it sufficiently met the specification of read/write characteristics which was an areal recording density of 12 gigabits per square centimeter in the temperature range from 10° C. to 50° C. The sensing device using tunneling magnetoresistance used in this evaluation is the one which has a well-known structure comprising an upper magnetic pole, an antiferromagnetic layer, a pinned layer, an insulating layer, a free layer, and a lower magnetic pole.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

TABLE 1

|  |  | Target composition | Ar gass pressure (Pa) | Thickness (nm) |
|---|---|---|---|---|
| Adhesion layer | 1st underlayer 12 | $Co_{50}Ti_{50}$ | 1 | 1-35 |
|  | 2nd underlayer 13 | $Ni_{62.5}Ta_{37.5}$ | 1 | 1-35 |
| Soft magnetic underlayer | 1st soft magnetic layer 14 | $Co_{92}Ta_3Zr_5$ | 0.5 | 100 |
|  | Non-magnetic layer 15 | Ru | 0.6 | 0.7 |
|  | 2nd soft magnetic layer 16 | $Co_{92}Ta_3Zr_5$ | 0.5 | 100 |
| Intermediate layer 17 |  | Ru | 2 | 20 |
| Recording layer 18 |  | $CoCr_{13}Pt_{14}$—$SiO_2$ | 2 | 20 |
| Protective layer 19 |  | Carbon | 1 | 5 |

TABLE 2

|  | Media type | 1st underlayer CoTi | 2nd underlayer NiTa |
|---|---|---|---|
| This invention | A | ○ | ○ |
| Reference | B | ○ | x |
|  | C | x | ○ |
|  | D | x | x |

TABLE 3

|  | Media type | Adhesion layer structure (thickness: nm) | Magnetic characteristics | | | R/W characteristics | | |
|---|---|---|---|---|---|---|---|---|
|  |  |  | Hc (Oe) | SQ | Spike noise | S/N (dB) | Resolution (%) | log Byte Error Rate |
| This invention | A | CoTi(5)/NiTa(10) | 5.3 | 1 | ○ | 23.5 | 23.3 | −6.1 |
| Reference | B | CoTi(15) | 4.9 | 0.95 | x | 22.8 | 22.9 | −5.1 |
|  | C | NiTa(15) | 5.3 | 1 | ○ | 23.4 | 23.1 | −6 |
|  | D | — | 4.8 | 0.92 | x | 21.1 | 19.2 | −4.8 |

TABLE 4

| | Media type | 1st Underlayer CoTi | 2nd Underlayer NiTa |
|---|---|---|---|
| This invention | A1 | 5 nm | 1-35 nm |
| | A2 | 1-35 nm | 5 nm |

TABLE 4-continued

| | Media type | 1st Underlayer CoTi | 2nd Underlayer NiTa |
|---|---|---|---|
| Reference | B | 5-40 nm | — |
| | C | — | 5-40 nm |

TABLE 5

| Media type | Adhesion layer structure (thickness: nm) | Hex(Oe) | Scratch resistance (mN) | Spike noise | S/N (dB) | log Byte Error Rate |
|---|---|---|---|---|---|---|
| A101 | $Co_{50}Ti_{50}(5)/Ni_{62}Ta_{38}(10)$ | 20.5 | 156 | ○ | 23.5 | −6.2 |
| A102 | $Co_{50}Ta_{50}(5)/Ni_{62}Ta_{38}(10)$ | 19.4 | 152 | ○ | 23.3 | −5.8 |
| A103 | $Cr_{50}Ti_{50}(5)/Ni_{62}Ta_{38}(10)$ | 19.5 | 150 | ○ | 22.9 | −5.9 |
| A104 | $Cr_{75}Ta_{25}(5)/Ni_{62}Ta_{38}(10)$ | 19.7 | 149 | ○ | 22.5 | −5.8 |
| A105 | $Al_{50}Ti_{50}(5)/Ni_{62}Ta_{38}(10)$ | 20.2 | 155 | ○ | 23.1 | −6 |
| A106 | $Al_{80}Ta_{20}(5)/Ni_{62}Ta_{38}(10)$ | 19.8 | 152 | ○ | 22.2 | −6 |
| A107 | $Al_{50}Ni_{50}(5)/Ni_{62}Ta_{38}(10)$ | 19.3 | 148 | ○ | 23 | −6.2 |
| A108 | $Co_{45}Ti_{50}Ni_5(5)/Ni_{62}Ta_{38}(10)$ | 20.4 | 156 | ○ | 23.4 | −6.2 |
| A109 | $Co_{45}Ti_{45}Al_{10}(5)/Ni_{62}Ta_{38}(10)$ | 20.1 | 154 | ○ | 23.3 | −6.1 |
| A110 | $Cr_{43}Ti_{45}Al_{12}(5)/Ni_{62}Ta_{38}(10)$ | 19.6 | 148 | ○ | 22.8 | −5.6 |
| A111 | $Cr_{55}Ti_{40}Ta_5(5)/Ni_{62}Ta_{38}(10)$ | 19.5 | 145 | ○ | 22.7 | −5.8 |
| A112 | $Co_{50}Ti_{50}(5)/Ta(10)$ | 20.6 | 155 | ○ | 23.5 | −6 |
| A110 | $Co_{50}Ti_{50}(5)/Al_{50}Ta_{50}(10)$ | 19.2 | 154 | ○ | 23.3 | −5.8 |
| A111 | $Co_{50}Ti_{50}(5)/Cr_{50}Ta_{50}(10)$ | 19.3 | 153 | ○ | 23 | −6 |
| A112 | $Co_{50}Ti_{50}(5)/Ni_{53}Ta_{37}Zr_{10}(10)$ | 20.3 | 150 | ○ | 23.2 | −5.9 |
| A113 | $Co_{50}Ti_{50}(5)/Ni_{55}Ta_{37}Cr_8(10)$ | 19.1 | 153 | ○ | 22.9 | −5.7 |
| A114 | $Co_{50}Ti_{50}(5)/Ni_{53}Ta_{37}Ti_{10}(10)$ | 19.2 | 155 | ○ | 22.6 | −5.8 |
| A115 | $Co_{50}Ti_{50}(5)/Ni_{57}Ta_{38}Al_5(10)$ | 19 | 152 | ○ | 22.6 | −5.7 |
| A116 | $Al_{80}Ta_{20}(5)/Al_{50}Ta_{50}(10)$ | 19.1 | 160 | ○ | 22.3 | −5.6 |
| A117 | $Cr_{75}Ta_{25}(5)/Cr_{50}Ta_{50}(10)$ | 19 | 158 | ○ | 22.5 | −5.7 |

TABLE 6

| | Media type | Adhesion layer structure (thickness: nm) | Scratch resistance (mN) | Spike noise | S/N (dB) | log Byte Error Rate |
|---|---|---|---|---|---|---|
| This invention | A | CoTi(10)/NiTa(10) | 153 | ○ | 23.1 | −6 |
| Reference | E | NiTa(10)/CoTi(10) | 120 | x | 20.4 | −5 |
| | F | NiCrZr(5)/CoTi(5)/NiTa(10) | 118 | ○ | 22.9 | −5.9 |
| | G | CoTi(5)/NiCrZr(5)/NiTa(10) | 155 | ○ | 22.3 | −5.8 |
| | H | CoTi(5)/NiTa(10)/NiCrZr(5) | 155 | x | 21.7 | −5.1 |

TABLE 7

|  |  | Target composition | Ar gass pressure (Pa) | Thickness (nm) |
|---|---|---|---|---|
| Adhesion layer | 1st underlayer 82 | $Co_{45}Ti_{50}Ni_5$ | 1 | 5 |
|  | 2nd underlayer 83 | $Ni_{52.5}Ta_{37.5}Zr_{10}$ | 1 | 15 |
| Domain controle layer 84 |  | $Ni_{81}Fe_{19}$ | 0.5 | 5 |
|  |  | $Fe_{50}Mn_{50}$ | 1 | 15 |
|  |  | $Co_{90}Fe_{10}$ | 0.5 | 2.5 |
| Soft magnetic underlayer 85 | 1st soft magnetic layer | $Co_{92}Ta3Zr_5$ | 0.5 | 50 |
|  | Non-magnetic layer 86 | Ru | 0.6 | 0.7 |
|  | 2nd soft magnetic layer 87 | $Co_{92}Ta_3Zr_5$ | 0.5 | 50 |
| Intermediate layer 88 |  | Ta | 1 | 1 |
|  |  | Ru | 2 | 19 |

TABLE 7-continued

|  |  | Target composition | Ar gass pressure (Pa) | Thickness (nm) |
|---|---|---|---|---|
| Recording layer 89 |  | $CoCr_{13}Pt_{14}$—$SiO_2$ | 2 | 20 |
| Protective layer 90 |  | Carbon | 1 | 5 |

TABLE 8

|  |  |  | Hex (Oe) | |
|---|---|---|---|---|
| Position | Radius: r (mm) | Angle (deg) | This convention: I | Reference: J |
| 1 | 30 | 0 | 20.4 | 16.4 |
| 2 | 30 | 90 | 20.6 | 15.2 |
| 3 | 30 | 180 | 20.5 | 15.8 |
| 4 | 30 | 270 | 20.2 | 16 |
| 5 | 23 | 0 | 19.9 | 11.2 |
| 6 | 23 | 90 | 19.7 | 9.8 |
| 7 | 23 | 180 | 20.1 | 10.5 |
| 8 | 23 | 270 | 19.2 | 12.3 |
| 9 | 15 | 0 | 18.9 | 7.3 |
| 10 | 15 | 90 | 19 | 6.2 |
| 11 | 15 | 180 | 19.2 | 8.4 |
| 12 | 15 | 270 | 19.5 | 5.9 |

TABLE 9

|  | Media type | Adhesion layer structure (thickness: nm) | Hc (Oe) | SQ | Spike noise | S/N (dB) | log Byte Error Rate |
|---|---|---|---|---|---|---|---|
| This invention | I | CoTiNi(5)/NiTaZr(15) | 5.2 | 1 | ○ | 23.5 | −6 |
| Reference | J | CoTiNi(5)/NiAl(15) | 4.7 | 0.93 | x | 20.3 | −4.7 |

TABLE 10

|  | Media type | Recording layer structure (thickness: nm) | S/N (dB) | Resolution (%) | log Byte Error Rate |
|---|---|---|---|---|---|
| This invention | K | CoCrPt—TaO(15) | 23.6 | 23 | −6 |
|  | L | $[Co/Pd]_{20}(15)$ | 21.2 | 22.1 | −5.6 |
|  | M | $[Co/Pt]_{20}(15)$ | 20.3 | 21.9 | −5.5 |

What is claimed is:

1. A perpendicular magnetic recording medium comprising:
   a substrate;
   an adhesion layer formed on a substrate in which a second underlayer is laminated on top of a first underlayer;
   a soft magnetic underlayer formed on said adhesion layer;
   an intermediate layer formed on said soft magnetic underlayer; and
   a perpendicular recording layer formed on said intermediate layer, wherein said first underlayer contains at least two elements selected from the group consisting of Ni, Al, Ti, Ta, Cr, and Co, and said second underlayer includes an amorphous structured Ta-based alloy containing at least one element selected from Ni, Al, Ti, Cr, and Zr, wherein the first underlayer and the second underlayer of said adhesion layer include alloys composed of different compositions.

2. A perpendicular magnetic recording medium according to claim 1, wherein said first underlayer is composed of one selected from the group consisting of a Co—Ti alloy, a Co—Ta alloy, a Cr—Ti alloy, a Cr—Ta alloy, an Al—Ti alloy, an Al—Ta alloy, an Al—Ni alloy, a Co—Ti—Ni alloy, a Co—Ti—Al alloy, a Cr—Ti—Al alloy and a Cr—Ti—Ta alloy.

3. A perpendicular magnetic recording medium according to claim 1, wherein said second underlayer is composed of one selected from the group consisting of a Ni—Ta alloy, an Al—Ta alloy, a Cr—Ta alloy, a Ni—Ta—Zr alloy, a Ni—Ta—Ti alloy, a Ni—Ta—Cr alloy and a Ni—Ta—Al alloy.

4. A perpendicular magnetic recording medium according to claim 1, wherein the thickness of said first underlayer is about 2-20 nm and the thickness of said second underlayer is about 2-30 nm.

5. A perpendicular magnetic recording medium according to claim 1, wherein said soft magnetic underlayer includes a first soft magnetic layer, a second soft magnetic layer, a nonmagnetic layer formed between said first soft magnetic layer and said second soft magnetic layer, and said first soft magnetic layer and said second magnetic layer are antiferromagnetically coupled through the nonmagnetic layer.

6. A perpendicular magnetic recording medium according to claim 1, wherein said soft magnetic underlayer is formed of an amorphous structured alloy mainly composed of one of Co and Fe.

7. A perpendicular magnetic recording medium according to claim 6, wherein said soft magnetic underlayer is about 20-150 nm in thickness.

8. A perpendicular magnetic recording medium according to claim 1, wherein said intermediate layer is formed of one selected from Ru, a Ru—based alloy having a hexagonal close-packed structure or a face-center cubic structure, and an alloy having a granular structure.

9. A perpendicular magnetic recording medium according to claim 1, wherein said recording layer is composed mainly of CoCrPt and an alloy having a granular structure to which an oxide is added.

10. A perpendicular magnetic recording medium comprising:
    a substrate;
    an adhesion layer formed on a substrate in which a second underlayer is laminated on top of a first underlayer;
    a soft magnetic underlayer formed on said adhesion layer;
    an intermediate layer formed on said soft magnetic underlayer; and
    a perpendicular recording layer formed on said intermediate layer, wherein said first underlayer contains at least two elements selected from the group consisting of Ni, Al, Ti, Ta, Cr, and Co, and said second underlayer includes an amorphous structured Ta-based alloy containing at least one element selected from Ni, Al, Ti, Cr, and Zr, wherein said second underlayer is composed of one selected from the group consisting of a Ni—Ta alloy, an Al—Ta alloy, a Cr—Ta alloy, a Ni—Ta—Zr alloy, a Ni—Ta—Ti alloy, a Ni—Ta—Cr alloy and a Ni—Ta—Al alloy, and
    wherein said first underlayer is composed of one selected from the group consisting of a Co—Ti alloy, a Co—Ta alloy, a Cr—Ti alloy, a Cr—Ta alloy, an Al—Ti alloy, an Al—Ta alloy, an Al—Ni alloy, a Co—Ti—Ni alloy, a Co—Ti—Al alloy, a Cr—Ti—Al alloy and a Cr—Ti—Ta alloy.

11. A perpendicular magnetic recording medium according to claim 3, wherein the thickness of said first underlayer is about 2-20 nm and the thickness of said second underlayer is about 2-30 nm.

12. A perpendicular magnetic recording medium according to claim 3, wherein said soft magnetic underlayer is formed of an amorphous structured alloy mainly composed of one of Co and Fe.

13. A perpendicular magnetic recording medium according to claim 12, wherein said soft magnetic underlayer is about 20-150 nm in thickness.

14. A perpendicular magnetic recording medium according to claim 3, wherein said intermediate layer is formed of one selected from Ru, a Ru-based alloy having a hexagonal close-packed structure or a face-center cubic structure, and an alloy having a granular structure.

15. A perpendicular magnetic recording medium according to claim 3, wherein said recording layer is composed mainly of CoCrPt and an alloy having a granular structure to which an oxide is added.

16. A perpendicular magnetic recording medium comprising:
    a substrate;
    an adhesion layer formed on a substrate in which a second underlayer is laminated on top of a first underlayer;
    a soft magnetic underlayer formed on said adhesion layer;
    an intermediate layer formed on said soft magnetic underlayer; and
    a perpendicular recording layer formed on said intermediate layer, wherein said first underlayer contains at least two elements selected from the group consisting of Ni, Al, Ti, Ta, Cr, and Co, and said second underlayer includes an amorphous structured Ta-based alloy containing at least one element selected from Ni, Al, Ti, Cr, and Zr, wherein said soft magnetic underlayer includes a first soft magnetic layer, a second soft magnetic layer, a nonmagnetic layer formed between said first soft magnetic layer and said second soft magnetic layer, and said first soft magnetic layer and said second magnetic layer are antiferromagnetically coupled through the nonmagnetic layer, and
    wherein said first underlayer is composed of one selected from the group consisting of a Co—Ti alloy, a Co—Ta alloy, a Cr—Ti alloy, a Cr—Ta alloy, an Al—Ti alloy, an Al—Ta alloy, an Al—Ni alloy, a Co—Ti—Ni alloy, a Co—Ti—Al alloy, a Cr—Ti—Al alloy and a Cr—Ti—Ta alloy.

17. A perpendicular magnetic recording medium according to claim 5, wherein the thickness of said first underlayer is about 2-20 nm and the thickness of said second underlayer is about 2-30 nm.

18. A perpendicular magnetic recording medium according to claim 5, wherein said soft magnetic underlayer is formed of an amorphous structured alloy mainly composed of one of Co and Fe.

19. A perpendicular magnetic recording medium according to claim 18, wherein said soft magnetic underlayer is about 20-150 nm in thickness.

20. A perpendicular magnetic recording medium according to claim 5, wherein said intermediate layer is formed of one selected from Ru, a Ru-based alloy having a hexagonal close-packed structure or a face-center cubic structure, and an alloy having a granular structure.

21. A perpendicular magnetic recording medium according to claim 5, wherein said recording layer is composed mainly of CoCrPt and an alloy having a granular structure to which an oxide is added.

* * * * *

UNITED STATES PATENT AND TRADEMARK OFFICE
CERTIFICATE OF CORRECTION

PATENT NO. : 7,666,530 B2 Page 1 of 1
APPLICATION NO. : 11/246452
DATED : February 23, 2010
INVENTOR(S) : Arai et al.

It is certified that error appears in the above-identified patent and that said Letters Patent is hereby corrected as shown below:

In the Claims:

column 17, line 64, please delete "first underlaver"
and insert -- first underlayer -- column 17, line 65, please delete "magnetic underlaver"
and insert -- magnetic underlayer -- column 17, line 65, please delete "adhesion laver"
and insert -- adhesion layer -- column 18, line 46, please delete "on said adhesion laver"
and insert -- on said adhesion layer --

Signed and Sealed this

Twenty-seventh Day of April, 2010

David J. Kappos
*Director of the United States Patent and Trademark Office*